Figure 1:
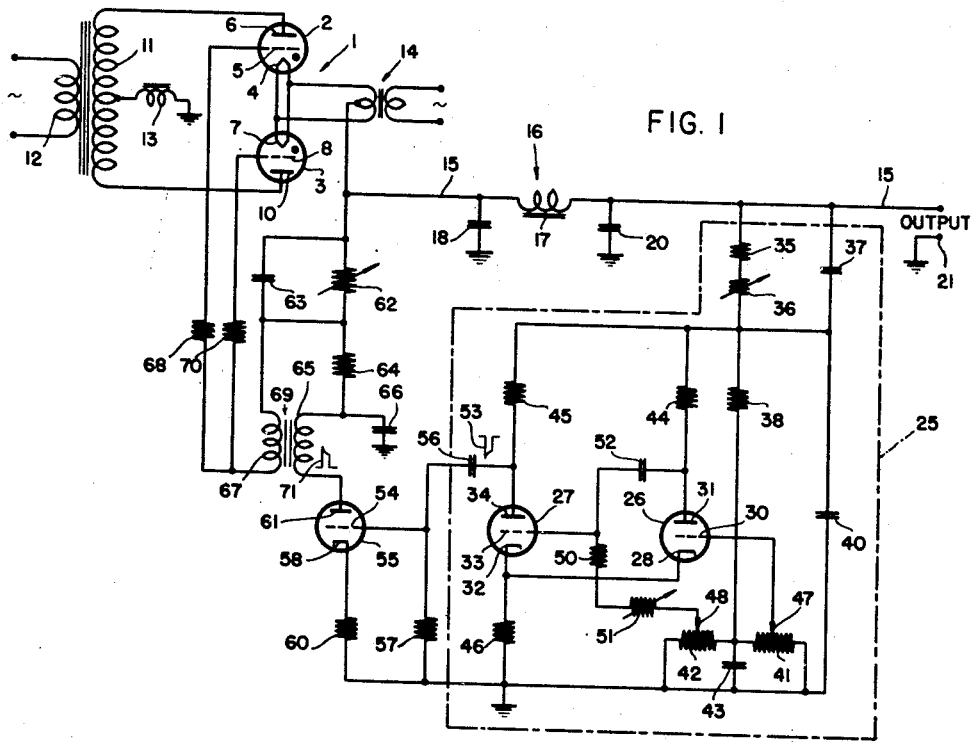

April 19, 1949.　　　　L. F. MAYLE　　　　2,467,765
REGULATED POWER SUPPLY
Filed April 25, 1947

INVENTOR.
LOUIS F. MAYLE
BY
Arthur A. Smith
ATTORNEY

Patented Apr. 19, 1949

2,467,765

UNITED STATES PATENT OFFICE 2,467,765

REGULATED POWER SUPPLY

Louis F. Mayle, Fort Wayne, Ind., assignor, by mesne assignments, to Farnsworth Research Corporation, a corporation of Indiana Application April 25, 1947, Serial No. 743,883

14 Claims. (Cl. 175—363)

This invention relates generally to regulated power supplies, and particularly pertains to a rectifier circuit including means for automatically keeping the unidirectional output voltage thereof at a predetermined value.

Regulated power supplies are frequently required in the field of electrical engineering for supplying, for example, plate voltage to amplifiers or oscillators and the like purposes. A certain class of voltage regulators comprises a regulator tube which may be arranged in series with or across the output circuit of the power supply and which has a resistance that depends upon the output voltage thereby to regulate the output voltage. The drawback of this class of power supplies is that a fairly large amount of current is dissipated particularly in the series resistor tube of the output circuit.

Another class of voltage regulators includes a full wave rectifier which usually has a filter network provided in its output circuit for smoothing the unidirectional output voltage. The full wave rectifier circuit may comprise two grid-controlled gas-filled tubes, such as thyratrons. By varying the bias voltage supplied to the grids of the thyratrons, the firing point of the tubes with respect to the alternating input voltage may be varied thereby to control the output voltage or current within certain limits. It has, for example, been proposed to vary the grid bias applied to the thyratrons of a full wave rectifier circuit by an electron discharge tube. The current through the discharge tube is made responsive to the output voltage whereby a control voltage may be derived which is impressed upon the control grids of the thyratrons. However, a circuit of this type also suffers from the drawback that the discharge tube which conducts current continuously requires a certain amount of power.

It has furthermore been suggested to provide a Wheatstone bridge, having a grid-controlled tube in one of its arms for automatically controlling the output voltage derived from a full wave rectifier circuit. The Wheatstone bridge in turn controls the phase of a sinusoidal wave impressed upon the control grids of the thyratrons forming part of the rectifier circuit. These prior systems, however, are usually not arranged so that the value of the output voltage may be varied at will and then automatically kept at the preset value.

It is an object of the present invention, therefore, to provide a regulated power supply having novel automatic means for preventing variations of the unidirectional output voltage of the power supply regardless of variations of the input voltage or of the load current.

Another object of the invention is to provide a constant voltage rectifier where the value of the output voltage may be varied at will within certain limits and can then be kept automatically at the preset value.

A further object of the invention is to provide a full wave rectifier circuit including grid-controlled gas-filled tubes and having means for automatically regulating the unidirectional output voltage within a wide range of load current which has a smooth and substantially instantaneous control action and requires little power for the automatic control means.

In accordance with the present invention there is provided a regulated power supply comprising a rectifier circuit including an electron discharge device such as a grid-controlled gas-filled tube. Means are provided for impressing an alternating voltage on the rectifier circuit. An output circuit is coupled to the rectifier circuit for deriving a regulated unidirectional output voltage, and a source of electrical waves is coupled to the output circuit. The wave source preferably is an oscillator such as a relaxation oscillator arranged for developing output pulses. Finally means are provided for deriving a wave, which may consist of pulses, from the wave source and impressing the wave or pulses on the electron discharge device. The frequency of the output wave or of the output pulses is responsive to variations of the output voltage. In this manner the electron discharge device is controlled in response to variations of the output voltage.

For a better understanding of the invention, together with other and further objects thereof, reference is made to the following description, taken in connection with the accompanying drawing, and its scope will be pointed out in the appended claims.

Figure 2:
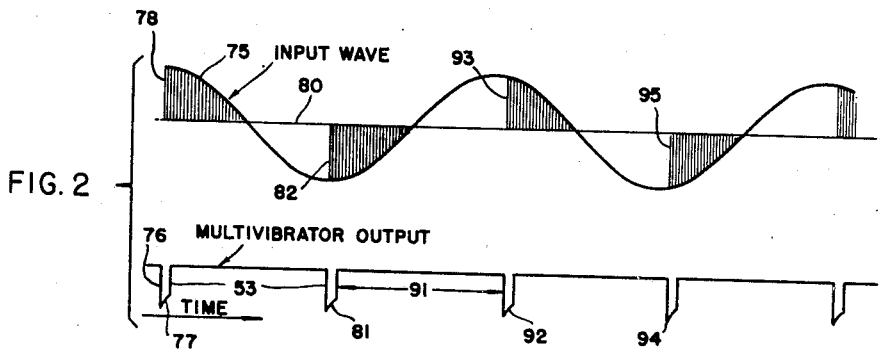
Figure 3:
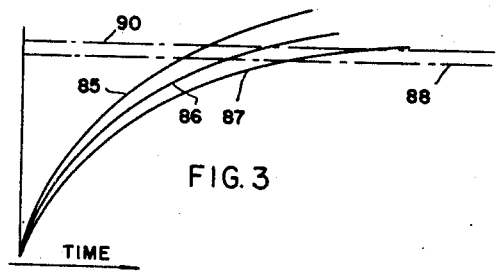

In the accompanying drawing:

Fig. 1 is a circuit diagram of a regulated power supply including a full wave rectifier circuit and embodying the present invention;

Fig. 2 illustrates a set of curves showing the input wave impressed upon the full wave rectifier circuit of the power supply and the pulses derived from the multivibrator of the control circuit and utilized for firing the grid-controlled gas-filled tubes of the rectifier circuit; and Fig. 3 is a graph of voltages which may be derived from the multivibrator and which will be referred to in explaining the operation of the power supply of the invention.

Referring now to Fig. 1, there is illustrated a regulated power supply in accordance with the present invention comprising a conventional full wave rectifier circuit 1. Rectifier circuit 1 includes tubes 2 and 3 which are of the gas-filled type as indicated. Tube 2 includes cathode 4, control grid 5 and anode 6, while tube 3 comprises cathode 7, control grid 8 and anode 10. Gas-filled tubes 2 and 3 preferably are thyratrons although other grid-controlled gas-filled tubes may be used instead.

Anodes 6 and 10 of thyratrons 2 and 3 are connected to the terminals of inductance element 11 forming the secondary of a transformer, the primary 12 of which is connected to a suitable alternating voltage supply as indicated, which may have a frequency of 60 cycles per second. The center tap of inductance element 11 is connected to ground through choke 13. The filaments of cathodes 4 and 7 are supplied with heater current through transformer 14, the primary of which is connected to a suitable alternating current source which may be the same source connected to inductance element 12.

The output circuit of the full wave rectifier circuit 1 includes a positive voltage output lead 15 which is connected to the center tap of the secondary of transformer 14, that is, to cathodes 4 and 7. A conventional pi-section filter network 16 is connected to positive output lead 15 and includes series choke 17 which is by-passed to ground by condensers 18 and 20. A unidirectional output voltage may be derived from output lead 15 and output lead 21 which is connected to ground as shown, that is, to the grounded terminal of choke 13.

In accordance with the present invention the unidirectional output voltage derived from output leads 15 and 21 is regulated to keep it at a predetermined value in spite of variations of the input voltage impressed upon inductance element 12 or variations of the load impedance connected across output leads 15 and 21. This is effected by controlling the firing point of thyratrons 2 and 3 by applying a wave to their control grids 5 and 8, respectively. To this end there is provided a suitable free-running oscillator such as indicated in dotted lines at 25. Free-running oscillator 25 should be of such a type that the frequency of its output wave depends upon the voltage supplied thereto such as the anode voltage supply or the bias voltage supplied to its control grid. The frequency of the output wave derived from most oscillators is dependent to some extent upon the voltage supplied to the oscillator so that almost any oscillator may be used for the power supply of the invention.

Preferably free-running oscillator 25 is a relaxation oscillator such as a multivibrator as illustrated. Multivibrator 25 is arranged to develop output pulses at a predetermined frequency which are impressed on control grids 5 and 8 of thyratrons 2 and 3. The frequency of the output pulses derived from multivibrator 25 decreases when the voltage across output leads 15 and 21 increases thereby to change the phase during each cycle of the alternating input voltage when thyratrons 2 and 3 are fired as will be more fully explained hereinafter.

Multivibrator 25 includes two vacuum tubes 26 and 27 having cathode 28, control grid 30, anode 31 and cathode 32, control grid 33 and anode 34, respectively. Anodes 31 and 34 are supplied with anode voltage through a voltage divider. The voltage divider is connected across output leads 15, 21 and includes resistors 35, 36, one of which is adjustable as indicated, which are by-passed by condenser 37 and resistor 38 by-passed to ground that is output lead 21, by condenser 40 and resistors 41 and 42 connected in parallel between resistor 38 and ground. The junction point of resistors 41 and 42 is by-passed to ground by condenser 43. It will accordingly be seen that the voltage divider including resistors 35, 36, 38, 41 and 42 is connected between output lead 15 and ground, that is, across the output circuit of full wave rectifier circuit 1. Anodes 31 and 34 are connected to the junction point between resistors 36 and 38 through anode resistors 44 and 45, respectively. The anode voltage supplied to anodes 31 and 34 of vacuum tubes 26 and 27 accordingly depends upon the output voltage of full wave rectifier circuit 1.

Cathodes 28 and 32 of the two vacuum tubes are connected together to ground through common cathode resistor 46. Control grid 30 of vacuum tube 26 is supplied with a suitable positive grid bias voltage through tap 47 on resistor 41 forming part of the voltage divider. Control grid 33 of vacuum tube 27 is supplied with a suitable positive grid bias voltage through variable tap 48 on resistor 42 which also forms part of the voltage divider. Tap 48 is connected to control grid 33 through grid leak resistors 50 and 51, one of which is adjustable as illustrated. Anode 31 of vacuum tube 26 is coupled to control grid 33 of vacuum tube 27 through coupling condenser 52.

In a manner to be described hereinafter output pulses of negative polarity such as indicated at 53 are developed across anode resistor 45 and impressed upon control grid 54 of buffer amplifier 55 through coupling condenser 56. Control grid 54 is connected to ground through grid leak resistor 57. Buffer amplifier 55 further includes cathode 58 connected to ground through cathode resistor 60, while its anode 61 is connected to positive output lead 15. Between output lead 15 and anode 61 there is provided resistor 62 which is adjustable and which is by-passed by condenser 63, resistor 64 and the primary 65 of transformer 69. The junction point between resistor 64 and inductance element 65 is by-passed to ground through condenser 66. Inductance element 67 which is the secondary of transformer 69 has one of its terminals connected to the junction point between resistors 62 and 64, while its other terminal is connected to control grids 5 and 8 of thyratrons 2 and 3 through resistors 68 and 70. Buffer amplifier 55 is arranged to be normally conducting.

The RC network including adjustable resistor 62 and by-pass condenser 63 which is provided in the grid circuits of thyratrons 2 and 3 provides the normal grid bias for control grids 5 and 8. The grid circuits of the thyratrons further include inductance element 67 which forms the secondary of transformer 69 having as a primary inductance element 65. By virtue of this connection a low impedance path is provided for the unidirectional current flowing in the grid circuits of thyratrons 2 and 3.

For a better understanding of the operation of the circuit of Fig. 1, the mode of operation of multivibrator 25 will first be explained. Assume that full wave rectifier circuit 1 is operating so that positive output lead 15 carries a positive unidirectional voltage which energizes multivibrator 25. Assume further that vacuum tube 26 is initially conducting space current. Accordingly, a voltage drop is developed across anode resistor 44 which is impressed through coupling condenser 52 upon control grid 33 of vacuum 27. Thus the negative potential impressed upon control grid 33 will bias vacuum tube 27 to cutoff. The negative charge impressed upon coupling condenser 52 will be dissipated to ground through grid leak resistors 50, 51 and the portion of resistor 42 arranged between tap 48 and ground. After a certain interval of time which is determined by the time constant of condenser 52 and resistors 50, 51 and the portion of resistor 42 provided in the grid circuit, the negative charge on coupling condenser 52 will have leaked off to such an extent that space current begins to flow through vacuum tube 27.

In view of the larger current now flowing through common cathode resistor 46 the potential of cathode 28 of discharge tube 26 is raised thereby extinguishing vacuum tube 26. As soon as vacuum tube 26 ceases to conduct space current, the voltage across its anode resistor 44 rises whereby a positive potential is impressed upon coupling condenser 52. The voltage of control grid 33 is accordingly raised to such an extent that a large space current will flow through tube 27 and that the tube will draw grid current thereby providing a discharge path for coupling condenser 52 through control grid 33, cathode 32 and cathode resistor 46.

Accordingly the positive charge which has previously been impressed upon coupling condenser 52 will be rapidly dissipated thereby driving control grid 33 sufficiently negative to either cut off or greatly reduce the space current through tube 27. In view of the smaller current now flowing through cathode resistor 46, the voltage of cathode 28 of tube 26 is driven more negative so that space current will again be initiated through tube 26. The cycle of operation of multivibrator 25 will now repeat again.

It will thus be seen that every time tube 27 conducts space current, a negative pulse such as indicated at 53 is developed across its anode resistor 45 and impressed upon control grid 54 of buffer amplifier 55 through coupling condenser 56. Buffer amplifier 55 which is arranged normally to conduct space current is now cut off so that a positive pulse such as shown at 71 is developed upon the arrival of negative pulse 53 across inductance element 65 connected to the anode circuit of buffer amplifier 55. This positive pulse 71 is impressed through inductance element 67 and resistor 68 and 70, respectively, upon the control grids 5 and 8 of thyratrons 2 and 3. Accordingly, one of the thyratrons 2 or 3 will fire, that is, the thyratron having a voltage impressed upon its anode which is positive with respect to that of its cathode.

Assume that thyratron 2 has a voltage impressed on its anode 6 which is positive with respect to that of its cathode 4 so that thyratron 2 will fire. Once thyratron 2 is fired, its control grid 5 loses control of the discharge through the tube as is well known, and the tube will continue to conduct until the voltage difference between its anode 6 and cathode 4 is insufficient to maintain a discharge through the thyratron.

Preferably, the frequency of multivibrator 25 is normally twice that of the frequency of the sinusoidal wave impressed upon inductance element 12. Accordingly, when a sinusoidal wave having a frequency of 60 cycles per second is impressed upon transformer 12, 11, the normal frequency of output pulses 53 derived from multivibrator 25 should be 120 cycles per second so that successive pulses will fire alternately one of the thyratrons 2 and 3.

Referring now to Fig. 2, there is illustrated input wave 75 which is impressed upon inductance element 12 of full wave rectifier circuit 1. The multivibrator output pulses are indicated generally at 53 in Fig. 2. It is to be understood, however, that positive pulses such as illustrated at 71 in Fig. 1 are impressed upon control grids 5 and 8 of thyratrons 2 and 3. The leading edge 76 of the first pulse 77 will accordingly fire one of the thyratrons which may be assumed to be thyratron 2. This has been indicated by the vertical line 78 in Fig. 2. Thyratron 2 will continue to conduct current until the voltage difference between its anode 6 and its cathode 4 is insufficient to maintain a discharge which may, for convenience, be assumed to happen when input wave 75 intersects the zero or reference axis 80. When the next pulse 81 arrives, thyratron 3 is fired as indicated at 82, etc. The shaded areas between input wave 75 and reference axis 80 indicate the conducting periods of thyratrons 2 and 3.

As already explained multivibrator 25 should be adjusted to have output pulses of a frequency which is normally twice the frequency of sinusoidal input wave 75 to fire thyratrons 2 and 3 alternately. The frequency of multivibrator 25 may be adjusted by adjusting grid leak resistor 51 or by varying taps 47 or 48. As shown in Fig. 3, the voltage across coupling condenser 52 during the conduction period of tube 26 may vary as shown by curve 85. When the resistance of adjustable grid leak resistor 51 is increased, the negative charge impressed upon coupling condenser 52 when tube 26 begins to conduct space current is dissipated more slowly as illustrated by curves 86 and 87. The normal grid bias voltage supplied from tap 48 to control grid 33 may be represented by dotted line 88 in Fig. 3. As soon as one of the curves 85, 86 and 87 depending on the value of resistor 51 intersects dotted line 88, tube 27 will again begin to conduct space current.

The grid bias voltage supplied by tap 48 to control grid 33 of tube 27 may also be varied. Assume that tap 48 is moved to the left thereby reducing the positive grid bias voltage supplied to control grid 33. Accordingly, tube 27 will fire later as indicated in Fig. 3 by dotted line 90 representing the grid cut-off voltage because the negative charge impressed upon coupling condenser 56 must be reduced to a lower value before tube 27 will be able to fire again. It will accordingly be seen that the distance between the trailing edge of output pulse 77 and the leading edge of the succeeding pulse 81 is determined by the value of adjustable grid leak resistor 51 and by the position of variable tap 48 on resistor 42.

The width of output pulses 53 is determined by the position of variable tap 47 which supplies a positive grid bias voltage to control grid 30. Assume that variable tap 47 is moved to the right thereby supplying a lower positive grid bias voltage to control grid 30 of tube 26. Accordingly, tube 27 will conduct for a longer time because the voltage of cathode 28 of tube 26 must be depressed to a lower value before tube 26 will fire again. The width of pulses 53 may accordingly be adjusted independently upon the distance between the trailing edge of an output pulse such as 77 and the leading edge of the succeeding pulse 81. In this manner the frequency of output pulses 53 of multivibrator 25 may be adjusted to the desired value.

Assume now that the unidirectional output voltage across output leads 15 and 21 increases between the occurrence of output pulses 81 and 92 due to a decrease of the load current or to an increase of the input voltage impressed upon inductance element 12. Such an increase of the unidirectional output voltage has the effect of decreasing the frequency of output pulses 53 of multivibrator 25 so that the distance 91 between the trailing edge of output pulse 81 and the leading edge of output pulse 92 is increased.

An increase of the unidirectional output voltage will increase the plate voltage supplied to anodes 31 and 34. Accordingly, a larger negative charge is impressed upon coupling condenser 52 when tube 26 begins to conduct space current which will require a longer time to dissipate, thus increasing distance 91. This decrease of the frequency of output pulses 53 is partly counteracted by the increase of the grid bias voltages supplied to control grids 30 and 33 of tubes 26 and 27 as will be evident from the above explanation. However, it has been established by experiments that the frequency of the output pulses 53 decreases when the voltage in output lead 15 increases.

Accordingly, the leading edge of output pulse 92 is delayed and will fire thyratron 2 at a later time during the cycle as indicated at 93. Hence the relative phase between output pulse 92 and input wave 75 is changed. Consequently, the thyratron fired by pulse 92 such as thyratron 2 will conduct for a shorter period of time which will decrease the output current and thus reduce the unidirectional output voltage derived from output leads 15 and 21. When the output voltage returns to its preset value, the frequency of multivibrator 25 will again be 120 cycles per second so that output pulse 94 will arrive at the same time with respect to input wave 75 as does output pulse 92, to fire one of the thyratrons such as thyratron 3 at a point indicated at 95. The only stable state of multivibrator 25 is at an output frequency of 120 cycles per second, that is, when the output voltage is at the preset value which will allow the multivibrator to develop pulses at its normal frequency.

It will be readily understood that a decrease of the output voltage will have the opposite effect, that is, it will increase the frequency of multivibrator 25 causing thyratrons 2 and 3 to fire earlier during the cycle so that a larger current is delivered into output leads 15 and 21 which tends to increase the output voltage.

It will be understood that multivibrator 25 and its voltage divider will require a comparatively small amount of power for regulating the output voltage. The control action is smooth and substantially instantaneous in view of the electronic control of the firing points of thyratrons 2 and 3. Experiments have revealed that a circuit such as illustrated in Fig. 1 will permit an output current of two amperes at an output voltage of 200 volts and a current of .5 amperes at an output voltage of 400 volts without causing hunting. Thus the power supply of Fig. 1 may be used with advantage as the anode voltage supply for the amplifiers and oscillators of a transmitter.

The power supply of the invention has a certain tendency to hunt when the circuit is started or when the load current is changed abruptly. This tendency was considerably reduced by arranging choke coil 13 between the center tap of inductance element 11 and ground, that is, in series with the nagative output lead 21, instead of connecting it between the center tap of transformer 14 and by-pass condenser 18, that is, in series with the positive output lead 15. The effect of this arrangement is to stabilize the voltage of cathodes 4 and 7 of the thyratrons while the voltage at the center tap of inductance element 11 is permitted to vary.

The unidirectional output voltage obtained from output leads 15 and 21 may be preset to any desired value. To this end the resistance of variable resistor 36 may be varied thereby varying the voltage drop across the branch of the voltage divider represented by resistors 35, 36 and condenser 37. Thus, the anode voltage supplied to multivibrator 25 may be kept at a certain constant value although the output voltage obtained from output leads 15 and 21 may be adjusted to a higher or lower value. The output voltage obtained from the power supply of the present invention may be adjusted within certain limits which are determined mainly by the power which may be derived from full wave rectifier 1. It will be readily understood that the output current which may be obtained from full wave rectifier circuit 1 can be no more than that obtained when thyratrons 2 and 3 conduct during the full cycle of the input wave.

It is to be understood that buffer amplifier 55 is not necessary for the operation of the circuit of the present invention. However, it has the advantage of isolating multivibrator 25 from the full wave rectifier circuit 1 and of reversing the polarity of the pulses derived across anode resistor 45 of the multivibrator.

While it will be understood that the circuit specifications of the power supply of the invention may vary according to the design for any particular application, the following circuit specifications are included, by way of example only, for a regulated power supply as disclosed in Fig. 1.

| | |
|---|---|
| Thyratrons 2 and 3 | CE–305 Type |
| Vacuum tube 26 | ½6SN7GT Type |
| Vacuum tube 27 | ½6SL7GT Type |
| Buffer amplifier 55 | ½6SN7GT Type |
| Inductance element 17 | .3 henry |
| Inductance element 13 | .3 henry |
| Resistor 35 | 22,000 ohms |
| Adjustable resistor 36 | 15,000 ohms |
| Resistor 38 | 22,000 ohms |
| Resistor 41 | 50,000 ohms |
| Resistor 42 | 50,000 ohms |
| Anode resistor 44 | 100,000 ohms |
| Anode resistor 45 | 2,000 ohms |
| Grid leak resistor 50 | 470,000 ohms |
| Adjustable grid leak resistor 51 | 500,000 ohms |
| Common cathode resistor 46 | 6,800 ohms |
| Grid leak resistor 57 | 220,000 ohms |
| Cathode resistor 60 | 68,000 ohms |
| Adjustable resistor 62 | 5,000 ohms |
| Resistor 64 | 20,000 ohms |
| Resistor 68 | 10,000 ohms |
| Resistor 70 | 10,000 ohms |
| Condenser 18 | 160 microfarads |
| Condenser 20 | 160 microfarads |
| Condenser 37 | 10 microfarads |
| Condenser 40 | 10 microfarads |
| Condenser 43 | 1 microfarad |
| Coupling condenser 52 | 6,000 micro-microfarads |
| Coupling condenser 56 | 500 micro-microfarads |
| Condenser 66 | 80 microfarads |
| Condenser 63 | 8 microfarads |

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A regulated power supply comprising a rectifier circuit including an electron discharge device, means for impressing an alternating voltage on said rectifier circuit, an output circuit coupled to said rectifier circuit for deriving a regulated unidirectional output voltage, a source of electrical waves coupled to said output circuit, and means for deriving pulses from said wave source and impressing them on said electron discharge device, the frequency of said pulses being responsive to variations of said output voltage, thereby to control said electron discharge device in response to variations of said output voltage.

2. A regulated power supply comprising a rectifier circuit including an electron discharge device, means for impressing an alternating voltage on said rectifier circuit, an output circuit coupled to said rectifier circuit for deriving a regulated unidirectional output voltage, an oscillator coupled to said output circuit, and means for deriving pulses from said oscillator and impressing them on said electron discharge device, the frequency of said pulses being responsive to variations of said output voltage, thereby to control said electron discharge device in response to variations of said output voltage.

3. A regulated power supply comprising a full wave rectifier circuit including a gas-filled tube having a control grid, means for impressing an alternating voltage on said rectifier circuit, an output circuit coupled to said rectifier circuit for deriving a regulated unidirectional output voltage, a free-running oscillator coupled to said output circuit, and means for deriving pulses from said oscillator and impressing them on said grid, the frequency of said pulses being responsive to variations of said output voltage, thereby to vary the firing point of said tube in response to variations of said output voltage.

4. A regulated power supply comprising a rectifier circuit including a grid-controlled gas-filled tube, means for impressing an alternating voltage on said rectifier circuit, an output circuit coupled to said rectifier circuit for deriving a regulated unidirectional output voltage, a free-running relaxation oscillator coupled to said output circuit, and means for deriving pulses from said oscillator and impressing them on the grid of said tube, the frequency of said pulses being responsive to variations of said output voltage, thereby to vary the firing point of said tube in response to variations of said output voltage.

5. A regulated power supply comprising a full wave rectifier circuit including two grid-controlled gas-filled tubes, means for impressing an alternating voltage on said rectifier circuit, an output circuit coupled to said rectifier circuit for deriving a regulated unidirectional output voltage, a free-running relaxation oscillator coupled to said output circuit, and means for deriving pulses from said oscillator and impressing them on the grids of said tubes, each of said pulses being of such a polarity as to initiate conduction in one of said tubes, the frequency of said pulses being responsive to variations of said output voltage in such a manner that said pulse frequency decreases when said output voltage increases, thereby to regulate said output voltage.

6. A regulated power supply comprising a full wave rectifier circuit including two gas-filled tubes, each having a control grid, means for impressing an alternating voltage on said rectifier circuit, an output circuit including a filter network coupled to said rectifier circuit for deriving a regulated unidirectional output voltage, a free-running multivibrator coupled to said output circuit, means for developing pulses from said multivibrator and impressing them on said grids, the frequency of said pulses being normally equal to twice the frequency of said alternating voltage and being responsive to variations of said output voltage in such a manner that said pulse frequency decreases when said output voltage increases, thereby to control the firing point of said tubes in dependence upon variations of said output voltage to keep said output voltage at a predetermined value.

7. A regulated power supply comprising a full wave rectifier circuit including two gas-filled tubes, each having a control grid, means for impressing an alternating voltage on said rectifier circuit, an output circuit coupled to said rectifier circuit for deriving a regulated unidirectional output voltage, a free-running multivibrator including two vacuum tubes, each having a plate and a cathode, impedance means for conductively connecting said plates and cathodes to said output circuit, means for developing pulses from said multivibrator and impressing them on said grids, the frequency of said pulses being responsive to variations of said output voltage in such a manner that said pulse frequency decreases when said output voltage increases, thereby to control the firing point of said gas-filled tubes in dependence upon variations of said output voltage to keep said output voltage at a predetermined value.

8. A regulated power supply comprising a full wave rectifier circuit including two gas-filled tubes, each having a control grid, means for impressing an alternating voltage on said rectifier circuit, an output circuit coupled to said rectifier circuit for deriving a regulated unidirectional output voltage, a free-running multivibrator including two vacuum tubes, each having a plate and a cathode, impedance means for conductively connecting said plates and cathodes across said output circuit, means for developing pulses of negative polarity from said multivibrator, an amplifier coupled between said multivibrator and said grids for impressing pulses of positive polarity on said grids, the frequency of said pulses being responsive to variations of said output voltage in such a manner that said pulse frequency decreases when said output voltage increases, thereby to control the firing point of said gas-filled tubes in dependence upon variations of said output voltage to keep said output voltage at a predetermined value.

9. A regulated power supply comprising a rectifier circuit including a gas-filled tube having a control grid, means for impressing an alternating voltage on said rectifier circuit, an output circuit coupled to said rectifier circuit for deriving a regulated unidirectional output voltage, a free-running multivibrator including a first and a second vacuum tube, each having an anode, a cathode and a control grid, a voltage divider connected across said output circuit, impedance means for conductively connecting the anodes of said two vacuum tubes to said voltage divider, a common cathode resistor for connecting the cathodes of said two vacuum tubes to said voltage divider, a coupling condenser for coupling the grid of said first vacuum tube to the anode of said second vacuum tube, a grid leak resistor connected to the grid of said first vacuum tube, means including said grid leak resistor for connecting the grids of said two vacuum tubes to said voltage divider, means coupled to said first vacuum tube for developing pulses and impressing them on the grid of said gas-filled tube, the frequency of said pulses being responsive to variations of said output voltage in such a manner that said pulse frequency decreases when said output voltage increases, thereby to control the firing point of said gas-filled tube in dependence upon variations of said output voltage to keep said output voltage at a predetermined value.

10. A regulated power supply comprising a full wave rectifier circuit including two gas-filled tubes, each having a control grid, means for impressing an alternating voltage on said rectifier circuit, an output circuit coupled to said rectifier circuit for deriving a regulated unidirectional output voltage, a free-running multivibrator including a first and a second vacuum tube, each having an anode, a cathode and a control grid, a voltage divider connected across said output circuit, impedance means for conductively connecting the anodes of said two vacuum tubes to said voltage divider, a common cathode resistor for connecting the cathodes of said two vacuum tubes to said voltage divider, a coupling condenser for coupling the grid of said first vacuum tube to the anode of said second vacuum tube, a grid leak resistor connected to the grid of said first vacuum tube, means including said grid leak resistor for connecting the grids of said two vacuum tubes to said voltage divider, means coupled to said first vacuum tube for developing pulses and impressing them on the grids of said gas-filled tubes, the frequency of said pulses being normally equal to twice the frequency of said alternating voltage and being responsive to variations of said output voltage in such a manner that said pulse frequency decreases when said output voltage increases, thereby to control the firing point of said gas-filled tubes in dependence upon variations of said output voltage to keep said output voltage at a predetermined value.

11. A regulated power supply comprising a full wave rectifier circuit including two gas-filled tubes, each having a control grid, means for impressing an alternating voltage on said rectifier circuit, an output circuit including a filter network coupled to said rectifier circuit for deriving a regulated unidirectional output voltage, a free-running multivibrator including a first and a second vacuum tube, each having an anode, a cathode and a control grid, a voltage divider connected across said output circuit, impedance means for conductively connecting the anodes of said two vacuum tubes to said voltage divider, a common cathode resistor for connecting the cathodes of said two vacuum tubes to said voltage divider, a coupling condenser for coupling the grid of said first vacuum tube to the anode of said second vacuum tube, a grid leak resistor connected to the grid of said first vacuum tube, means including said grid leak resistor for connecting the grids of said two vacuum tubes to said voltage divider, means including an amplifier coupled to said first vacuum tube for developing pulses and impressing them on the grids of said gas-filled tubes in such a polarity as to fire said gas-filled tubes, the frequency of said pulses being normally equal to twice the frequency of said alternating voltage and being responsive to variations of said output voltage in such a manner that said pulse frequency decreases when said output voltage increases, thereby to control the firing point of said gas-filled tubes in dependence upon variations of said output voltage to keep said output voltage at a predetermined value.

12. A regulated power supply comprising a full wave rectifier circuit including two gas-filled tubes, each having a control grid, means for impressing an alternating voltage on said rectifier circuit, an output circuit including a filter network coupled to said rectifier circuit for deriving a regulated unidirectional output voltage, a free-running multivibrator including a first and a second vacuum tube, each having an anode, a cathode and a control grid, a voltage divider connected across said output circuit, anode resistors for individually connecting the anodes of said two vacuum tubes to said voltage divider, a common cathode resistor for connecting the cathodes of said two vacuum tubes to said voltage divider, a coupling condenser for coupling the grid of said first vacuum tube to the anode of said second vacuum tube, a grid leak resistor connected to the grid of said first vacuum tube, said grid leak resistor being connected to said voltage divider, the grid of said second vacuum tube being connected to said voltage divider, an amplifier coupled to said first vacuum tube and to the grids of said gas-filled tubes for developing pulses of such a polarity as to initiate current conduction through said gas-filled tubes, the frequency of said pulses being normally equal to twice the frequency of said alternating voltage and being responsive to variations of said output voltage in such a manner that said pulse frequency decreases when said output voltage increases, thereby to keep said output voltage at a predetermined value.

13. A regulated power supply comprising two gas-filled tubes, each having a cathode, a control grid and an anode, the cathodes of said gas-filled tubes being connected together, a positive voltage output lead connected to the cathodes of said gas-filled tubes, a first inductance element having its terminals connected to the anodes of said gas-filled tubes, means for impressing an alternating voltage on said first inductance element, a negative voltage output lead, a second inductance element connected between said negative voltage output lead and the center tap of said first inductance element, a filter network including a third inductance element connected in series to said positive voltage output lead, two condensers for connecting the terminals of said third inductance element to said negative voltage output lead, a free-running multivibrator including a first and a second vacuum tube, each having an anode, a cathode and a control grid, a voltage divider connected across said output leads, impedance means for conductively connecting the anodes of said vacuum tubes to said voltage divider, a common cathode resistor for connecting the cathodes of said vacuum tubes to said negative voltage output lead, a coupling condenser for coupling the grid of said first vacuum tube to the anode of said second vacuum tube, a grid leak resistor connected to the grid of said first vacuum tube, means including said grid leak resistor for connecting the grids of said vacuum tubes to said voltage divider, means coupled to said first vacuum tube for developing pulses and impressing them on the grids of said gas-filled tubes, the frequency of said pulses being responsive to variations of the output voltage derived from said output leads in such a manner that said pulse frequency decreases when said output voltage increases, thereby to control the firing point of said gas-filled tubes in dependence upon variations of said output voltage to keep said output voltage at a predetermined value.

14. A regulated power supply comprising two gas-filled tubes, each having a cathode, a control grid and an anode, the cathodes of said gas-filled tubes being connected together, a positive voltage output lead connected to the cathodes of said gas-filled tubes, a first inductance element having its terminals connected to the anodes of said gas-filled tubes, means for impressing an alternating voltage on said first inductance element, a negative voltage output lead, a second inductance element connected between said negative voltage output lead and the center tap of said first inductance element, a filter network including a third inductance element connected in series to said positive voltage output lead, two condensers for by-passing the terminals of said third inductance element to said negative voltage output lead, a free-running multivibrator including a first and a second vacuum tube, each having an anode, a cathode and a control grid, a voltage divider connected across said output leads, impedance means for conductively connecting the anodes of said vacuum tubes to said voltage divider, a common cathode resistor for connecting the cathodes of said vacuum tubes to said negative voltage output lead, a coupling condenser for coupling the grid of said first vacuum tube to the anode of said second vacuum tube, a grid leak resistor connected to the grid of said first vacuum tube, means including said grid leak resistor for individually connecting the grids of said vacuum tubes to said voltage divider, an amplifier coupled to said first vacuum tube for developing pulses and impressing them on the grids of said gas-filled tubes in such a polarity as to fire said tubes, the frequency of said pulses being normally equal to twice the frequency of said alternating voltage and being responsive to variations of the output voltage derived from said output leads in such a manner that said pulse frequency decreases when said output voltage increases, thereby to control the firing point of said gas-filled tubes in dependence upon variations of said output voltage to keep said output voltage at a predetermined value.

LOUIS F. MAYLE.

REFERENCES CITED

The following references are of record in the file of this patent:

UNITED STATES PATENTS

| Number | Name | Date |
| --- | --- | --- |
| 2,177,424 | Ytterberg | Oct. 24, 1939 |